FIG.-1

INVENTORS
SOL GREENBERG
IRVING FORREST
GEORGE GAUTHERIN

Morgan, Finnegan, Durham & Pine
ATTORNEYS

United States Patent Office 3,353,083
Patented Nov. 14, 1967

3,353,083
REGULATED AC-DC POWER SUPPLY
Sol Greenberg, 23 Ridge Drive, Port Washington, N.Y. 11050, George Gautherin, 48—11 59th St., Woodside, N.Y. 11377, and Irving Forrest, 21 Evelyn Road, Plainview, N.Y. 11803
Filed June 5, 1963, Ser. No. 285,780
15 Claims. (Cl. 321—18)

This invention relates to power supplies and more particularly to supplies for converting alternating current inputs to regulated DC outputs.

A general object of the invention is to provide improvements in the performance of regulated DC supplies. It is a more specific object of the invention to provide a general purpose DC supply having improvements in range of operation, insensitivity to line voltage variations, automatic voltage and current regulation, monitoring, line frequency and waveshape insensitivity, fault protection, internal losses, transient suppression, and adjustability.

These and other objects and advantages of the invention such as improved stabilizing and regulating techniques, will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Serving to illustrate an exemplary embodiment of the invention are the drawings of which.

Figure 1:
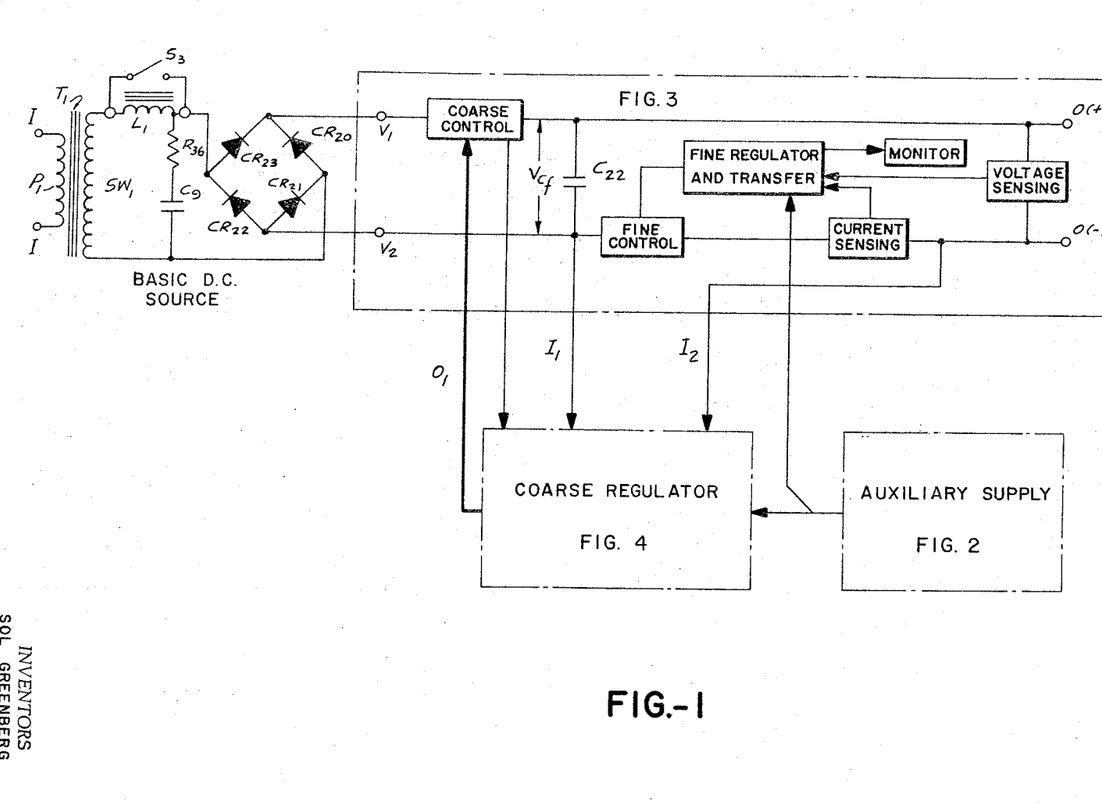
FIGURE 1 is a schematic block diagram illustrating tthe interrelationship of major components of the supply according to the invention.

As may be seen by reference to FIGURE 1, the supply according to the invention includes a basic DC source having a transformer $T_1$ adapted to be energized at terminals I—I of its primary winding $P_1$ by an alternating current. The DC source, which is conveniently developed by a full wave bridge $CR_{20}$–$CR_{23}$ delivers a full-wave rectified output which after regulation as described hereinafter, produces a regulated output at the terminals $O(+)$ and $O(-)$. The connection of AC power to the basic DC source includes selectable inductance $L_1$. A switch $S_3$ shunts $L_1$ when closed to provide operation at relatively high line frequencies, e.g., 300 c.p.s. to 500 c.p.s. The switch is opened and $L_1$ activated for limiting transformer current at low line frequency operation, e.g., 45–65 c.p.s.

As suggested in FIGURE 1, several stages of regulation are provided. To this end a *fine regulator and transfer circuit* is included, the output of which automatically adjusts a *fine control* stage in the circuit between the basic DC source and the output terminals. This fine regulator provides current and voltage regulation and accordingly receives inputs related to the output voltage, monitored by a *voltage sensing* circuit, as well as an input related to load current which is monitored by a *current sensing* circuit. The former is connected to the output terminals while the latter is in serial relationship with one of the output leads. Means are also included in the fine regulator for automatically selecting either the constant current mode or the constant voltage mode according to certain conditions. Monitoring of these modes of operation is provided by a *monitor* circuit connected to the fine regulator.

Cooperating with the fine regulator circuit is a *coarse regulator* circuit which develops a control signal $O_1$ for automatically controlling the switching of a *coarse control* device in the circuit between the primary power source and the main filter capacitance $C_{22}$. The coarse regulator system receives an input $I_1$–$I_2$ which is related to the voltage drop appearing across the fine control and current sensing circuit and functions to maintain this voltage drop at a substantially constant value. Several other inputs to the coarse regulator will be described hereinafter.

The system according to the invention further comprises an *auxiliary supply* which, as seen in FIGURE 1, provides energizing and reference voltages for various stages in the coarse and fine regulators.

AUXILIARY SUPPLY

Figure 2:
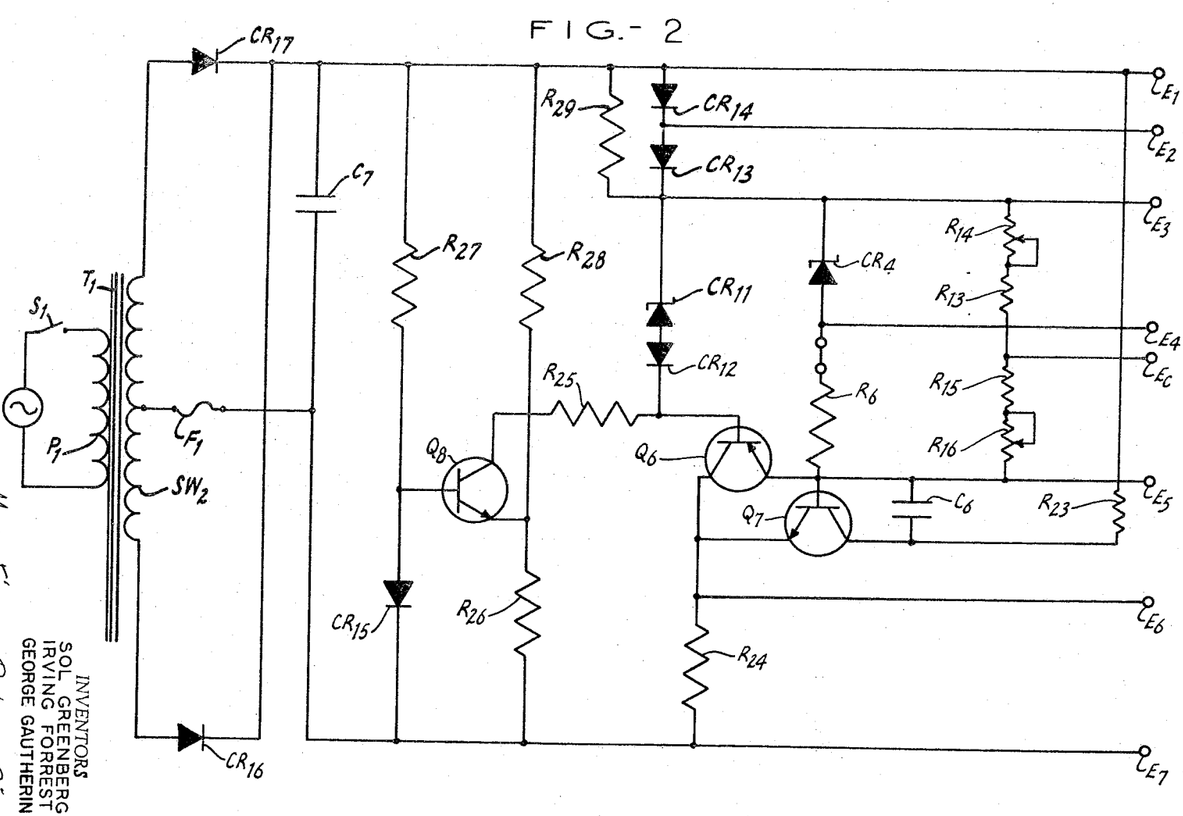
FIGURE 2 is a schematic wiring diagram of the auxiliary supply component.

Reference may now be made to FIGURE 2 which illustrates the circuit arrangement of the auxiliary supply which is adapted to supply energizing voltages and reference voltages to certain other elements of the system.

As seen in FIGURE 2, an AC potential is developed across the secondary winding $SW_2$ of the transformer $T_1$ which is energized from the primary winding $P_1$ (FIGURE 1). The potential across the secondary in converted to a unidirectional voltage, illustratively by means of a full wave circuit which includes rectifiers $CR_{16}$ and $CR_{17}$ in full wave configuration; the circuit also includes filter capacitance $C_7$. The relatively unregulated DC voltage appearing across capacitor $C_7$ is connected to and appears across terminals $E_1$ and $E_7$.

Energized by the potential $E_1$–$E_7$ are two branches $R_{27}$, $CR_{15}$ and $R_{28}$, $R_{26}$. $CR_{15}$ is a forwardly-conducting silicon junction diode. The branches $R_{27}$, $CR_{15}$ and $R_{28}$, $R_{26}$ supply energizing potential for a transistor $Q_8$. Thus the base of transistor $Q_8$ is connected to the junction of $R_{27}$ and $CR_{15}$ while the emitter thereof connects to the junction of $R_{28}$ and $R_{26}$. With this circuit arrangement, the voltage across $R_{26}$ tends to equal the somewhat constant voltage across $CR_{15}$. Hence the emitter current, and therefore the collector current, of $Q_8$ tends to be constant. The use of $CR_{15}$ instead of a zener diode has the advantage in this circuit of providing a measure of ambient temperature compensation since the thermal characteristic of $CR_{15}$ tend to compensate for the similar characteristics in the base-emitter junction of $Q_8$.

The effect of the connection which includes $R_{28}$ is to introduce into the base-emitter of $Q_8$, a corrective signal which compensates for the fact that the impedance of $CR_{15}$, although relatively low, is not zero whence line voltage fluctuations appear in attenuated form in the emitter-base circuit of $Q_8$ unless this compensation is provided. The effect of this connection also functions to minimize temperature fluctuations in $Q_8$ which would otherwise occur in the presence of $E_1$–$E_7$ voltage fluctuations, and which would not be compensated by $CR_{15}$. Proportioning of $R_{26}$ and $R_{28}$ may also be utilized to provide over-compensation. The overall circuit thus far described is thus seen to provide a relatively stable, substantially constant current in the collector of $Q_8$.

It may be observed that the circuit thus far described appears topologically similar to conventional error detector stages in many closed loop regulators. In such stages there is frequently provided a voltage reference branch and an output sampling branch to which are connected the emitter-base circuit of an error detecting transistor. However, in these arrangements the elements are chosen so that the emitter-base potential, and thus the emitter-collector current, varies in accordance with output voltage fluctuations. In contradistinction, the circuit herein described is designed to do the very opposite, i.e., maintain the emitter-base potential and emitter-collector current constant in spite of variations in the supply voltage.

The constant collector current in $Q_8$ also flows in the reverse current direction through $CR_{11}$, preferably a temperature compensated zener diode, and also through $CR_{12}$, these elements being in series and connected in a branch from the collector of $Q_8$ to terminal $E_1$; this branch also includes $R_{25}$ in serial relation and the series-parallel network $CR_{13}$–$CR_{14}$ and $R_{29}$. The constant current through zener diode $CR_{11}$ supplements the inherently and relatively constant voltage characteristic thereof, thereby providing a constant voltage across $CR_{11}$ which has stability improved over that provided by convenient zener diode circuits and so-called "constant current circuits."

Energized by the collector output of stage $Q_8$ is a power gain stage $Q_6$ in emitter-follower relationship. The emitter-base circuit of this stage is temperature stabilized with the aid of $CR_{12}$, the ambient thermal characteristics of which tend to offset the similar characteristic in the base-emitter junction of $Q_6$.

The stabilized emitter current of stage $Q_6$ flows from $E_1$ through the combination $R_{29}$, $CR_{14}$, $CR_{13}$, in part through temperature compensated zener diode $CR_4$ and resistor $R_6$, and in part through a branch paralleling $CR_4$ and $R_6$ and comprising serially connected resistance $R_{14}$, $R_{13}$, $R_{15}$ and $R_{16}$; the first and last-mentioned are conveniently variable. These branches, in response to the emitter current of $Q_6$ produces high stabilized voltages, especially the voltage $E_3$–$E_4$ dropped across $CR_4$. Voltage $E_3$–$E_4$ serves as a reference in the voltage control circuits of the fine regulator as hereinafter noted.

As previously noted, temperature stability of the base-emitter of $Q_6$ is aided by the presence of $CR_{12}$ which has similar thermal characteristics. However, in maintaining a constant current in its emitter circuit, the emitter-collector voltage of $Q_6$ will tend to vary in the presence of disturbances. As a consequence, the power dissipation of $Q_6$ will tend to vary causing a related change in the thermal characteristics of $Q_6$ which are not fully compensated by $CR_{12}$.

To overcome this difficulty, there is connected across the emitter-collector of $Q_6$, the base-emitter circuit of a further stage $Q_7$. The collector of $Q_7$ is returned through $R_{23}$ to $E_1$; the emitter is connected to $E_7$ via $R_{24}$ which is also common to the emitter of $Q_6$.

The tendency of the emitter-collector potential of $Q_6$ to change is thus counteracted by the corrective action of $Q_7$. A tendency toward voltage change in the emitter-collector of $Q_6$ produces a change in the emitter current of $Q_7$, thus producing a voltage change across $R_{24}$ which tends to offset the assumed change in $Q_6$.

The emitter current of $Q_6$ is thus seen to be a highly stabilized parameter which produces correspondingly stabilized output potentials $E_3$–$E_4$, $E_3$–$E_c$ and $E_c$–$E_5$. The latter potentials are conveniently adjustable by varying $R_{14}$ and $R_{16}$, respectively and are used in the current control circuits of the fine regulator as described hereinafter. Other potentials, such as $E_1$–$E_3$, $E_5$–$E_7$, $E_2$–$E_6$, and $E_2$–$E_5$ are used as noted hereinafter in other sections of the overall system.

It may be observed that the auxiliary supply circuit herein described and illustrated is in some respects of open loop character since an external feedback branch is not utilized; thus, certain instability problems associated with closed loop systems are avoided. In addition, no output filter is required thus eliminating the tendency of the supply to oscillate with decreasing temperature.

FINE REGULATOR

(1) Constant voltage mode

Figure 3:
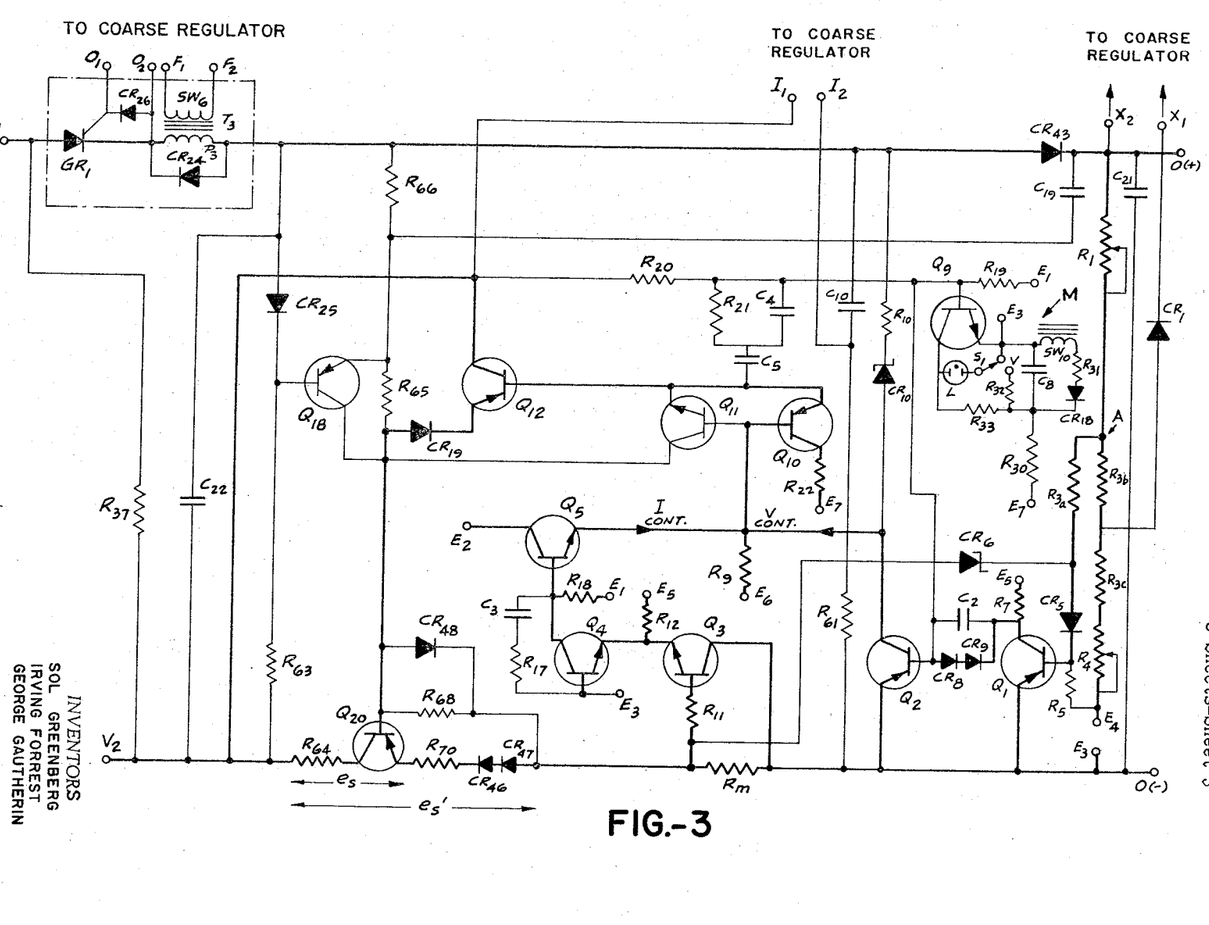
FIGURE 3 is a schematic wiring diagram illustrating components of the main supply including the fine regulator and load monitor thereof.

Reference may now be made to FIGURE 3 which illustrates the main supply with the fine regulator thereof as well as a monitor circuit generally indicated at M. The general organization of the components of FIGURE 3 may be seen by comparison to FIGURE 1. Thus, the unfiltered input derived from the bridge $CR_{20}$, $CR_{21}$ . . . $CR_{23}$, appears at terminals $V_i$ and $V_2$. The positive leg of the supply includes in serial relation the coarse control unit including a gated rectifier $GR_1$, and other components described more fully hereinafter; the output of the positive leg comprises terminal $O(+)$.

In serial relation in the negative leg is the fine control circuit including transistor $Q_{20}$ and supporting elements; also included in this leg are the current sensing means including resistor $R_m$ in serial relation with $Q_{20}$; the negative branch output appears at terminal $O(-)$.

The basic voltage-regulating data flow comprises the sensing of error voltages in a stage $Q_1$ and the transmission of a related corrective signal through stages $Q_2$, $Q_{10}$, and $Q_{12}$ to pass transistor $Q_{20}$. This is described further below.

Across output terminals $O(+)$ and $O(-)$ of the main supply are the voltage sensing means symbolized in FIGURE 1 and including variable resistor $R_1$, resistors $R_{3b}$, $R_{3c}$, variable calibrating resistor $R_4$, and a part of the auxiliary supply associated with the reference potential developed at terminals $E_4$ and $E_3$. The divider network tends to be energized by a substantially constant current by reason of the regulating characteristic described more fully hereinafter. Hence, a change in the resistance of this divider, e.g., by adjusting $R_1$, will produce in the voltage regulating mode a corresponding change in output voltage.

In the circuit for providing fine voltage regulation there is an input stage comprising transistor $Q_1$. It may be seen that in the base emitter-circuit of this stage there is the reference potential derived from terminals $E_3$, $E_4$ of the auxiliary supply together with a voltage drop, developed across $R_{3b}$, $R_{3c}$ and $R_4$ which responds to tendencies of the output voltage to change. Hence, the net input signal applied to $Q_1$ via $R_{3a}$ and $CR_5$, comprises an error voltage representing the difference between a fraction of the output voltage (across $R_{3b}$, $R_{3c}$, $R_4$) and the reference potential $(E_4 - E_3)$. Typically, this voltage measured at point A relative to $O(-)$, is in the millivolt range. The output can thus be reduced by adjusting $R_1$ to minimum to achieve a virtually zero-volt condition. In addition to the above, there is introduced into the input of $Q_1$ a temperature compensating potential, derived from $CR_5$.

If for any reason such as a malfunction, the output voltage rises above the nominal operating value, there is the danger of exceeding the reverse base bias on $Q_1$ causing its destruction. This is prevented by the clamping function provided by zener diode $CR_6$ and resistor $R_{3a}$.

The output of $Q_1$ affects the biasing in the base of transistor stage $Q_2$ via the parallel combination of serial diodes $CR_8$, $CR_9$ and a capacitor $C_2$. This combination is fed a small trickle current from $E_1$–$E_5$ via $R_{19}$ and $R_7$, thereby establishing conduction of $CR_8$ and $CR_9$. The net emitter-base potential of $Q_2$ includes the drop across $CR_8$, $CR_9$ and the collector-emitter potential of $Q_1$. Hence $Q_2$ responds to the error signal amplified by $Q_1$.

The branch including $R_{10}$ and $CR_{10}$ connected from the positive leg of the supply to the collector of $Q_2$ serves to clamp the base of following stage $Q_{10}$ in the event that the output divider is opened during operation.

Stages $Q_1$ and $Q_2$ receive emitter-collector potentials from terminals $E_3$–$E_5$ and $E_3$–$E_6$, respectively, of the auxiliary supply, both emitters being connected to terminal $E_3$ [which is also $O(-)$] and the collectors being connected via $R_7$ and $R_9$, respectively, to terminals $E_5$, $E_6$, respectively. Conduction through $CR_8$, $CR_9$ is also provided from $E_3$ to $E_5$ via the emitter-base of $Q_2$ when the latter is conducting.

The output of $Q_2$ appearing at the collector thereof is developed across $R_9$ and is thus effectively applied to the base of further stage $Q_{10}$, the base potential of which depends on the potential across $R_9$. The emitter-collector circuit of $Q_{10}$ is energized serially from $E_3$ to $E_7$ via $R_m$, $CR_{46}$, $CR_{47}$, $R_{70}$, the emitter-base of $Q_{20}$, $CR_{19}$, the emitter base of $Q_{12}$ and $R_{22}$. Variations in the output of $Q_2$ which affect the base potentail of $Q_{10}$, produce related variations in the emitter-collector current of stage $Q_{10}$ and thus effect the emitter-base current of driver stage $Q_{12}$. Consequently, the emitter-collector current of $Q_{12}$ varies as a function of the input error signal. The network $R_{21}$, $C_4$, $C_5$ which is connected to the emitter of $Q_{10}$ provides response modification to achieve desired bandwidth-gain and transient response characteristics.

$Q_{12}$ receives emitter-collector energizing potential from the drops $e_s$ and $e_s'$ across the fine control circuit in the negative branch of the main supply, one of the energizing paths including the emitter-base circuit of series regulator $Q_{20}$. In terms of overall supply, the driver is energized in part as a function of the difference between the source voltage across $C_{22}$, and the supply output voltage. To this extent the emitter-collector is energized in approximately parallel relation with the emitter-collector of the pass transistor $Q_{20}$.

The effective impedance between the emitter and collector of $Q_{20}$ is a function of the collector-emitter current of $Q_{12}$ which is ultimately determined by the voltage error in input stage $Q_1$. The arrangement is such that this impedance is varied in a manner tending to hold the output voltage constant. Any tendency for a change in the voltage across these terminals, produces a related change in the input to stage $Q_1$. As a result a related signal is coupled to the base of $Q_{20}$ via $Q_2$, $Q_{10}$ and $Q_{12}$ causing a readjustment of its emitter-collector impedance to offset in part this tendency.

In the above-described circuit and related components there are provided means for supplying $I_{co}$ current, means for insuring positive cut off of pass transistor $Q_{20}$ under no load conditions and means for utilizing driver $Q_{12}$ to supplement the regulating function of transistor $Q_{20}$. The latter, which involves the passage of a part of the load current through $Q_{12}$, results from the relation of $Q_{12}$ to $Q_{20}$ and the presence of $R_{64}$ which produces emitter-collector potential for $Q_{12}$ without increase in the voltage across $Q_{20}$. ($R_{70}$ is employed as an equalizing resistance in the case where a plurality of pass transistors are used; $CR_{46}$ and $CR_{47}$ supply a reverse bias for $Q_{20}$ which is effective notwithstanding short-circuit conditions).

It may be recalled that the output of stage $Q_2$ affects the potential cross $R_9$ which influences in turn the biasing of stages $Q_{10}$ and $Q_{11}$. It has already been shown that $Q_{10}$ responds to this potential and thereby controls driver $Q_{12}$. $Q_{11}$, on the other hand, is normally cut off. It may be noted that the emitter-base potential of $Q_{10}$ is the same as the emitter-base potential of $Q_{11}$. The latter however is an npn type. Thus the potential of $Q_{10}$ which causes conduction of $Q_{10}$ is effective in normally cutting-off $Q_{11}$. In the event of certain conditions such as high temperatures or a removal of load, the drop across $R_9$ will rise above a pre-determined value; $Q_{11}$ will thereupon conduct and $Q_{10}$ will cut-off. When $Q_{11}$ conducts it is supplied from a constant current source including the branch $CR_{25}$, $R_{63}$ and transistor $Q_{18}$ which has its base connected to the intermediate point of this branch and its emitter tied to the branch $R_{66}$, $R_{65}$. The latter is connected from the positive output leg to the base of $Q_{20}$. $CR_{25}$ supplies drive for $Q_{18}$ independent of output voltage, and due to the presence of $CR_{43}$ in the positive leg, $CR_{25}$ is effective during short-circuit conditions as well.

In view of the $Q_{18}$ current source, emitter-collector current flows in $Q_{11}$ under the specified conditions, this current flowing in the reverse direction through the base-collector of $Q_{12}$ to provide reverse bias ($I_{co}$) for the driver as required during load-off and high temperature conditions. The constant current source also supplies reverse drive to pass transistor $Q_{20}$ during these conditions.

The operation of the fine regulator in the constant voltage mode may be summarized as follows: a tendency for output voltage across terminals $O(+)$ and $O(-)$ to rise above the selected value causes the drop across $R_{3b}$, $R_{3c}$, $R_4$ to increase thus decreasing forward biasing of $Q_1$. The relatively positive potential at the collector of $Q_1$ increases, producing a corresponding increase in emitter-base current of $Q_2$; the latter flows through $CR_8$ and $CR_9$ to the $E_5$ terminal via $R_7$. Collector current of $Q_2$ thus increases, causing a corresponding decrease in the base-emitter current of $Q_{10}$. The resultant decrease in the base-emitter current of $Q_{10}$ reduces the forward drive to stages $Q_{12}$ and $Q_{20}$; the latter becomes less conductive whereby its emitter-collector impedance increases thus offsetting to a substantial extent, the initially assumed increase in output voltage. Reverse tendencies have an analogous effect. Conditions requiring $I_{co}$ current such a removal of load or high temperatures removes $Q_{10}$ from the above-described system; it is replaced by $Q_{11}$ which in the case of no load, cuts off the pass transistor; in the high temperature case, $Q_{11}$ regulates the pass transistor $Q_{20}$ via driver $Q_{12}$ and with the aid of constant current source $Q_{18}$.

(2) Constant current mode

The current regulating system will now be described and the sequence of regulating events integrated in the description. Basically, data flow is from the current error detector stage $Q_3$, $Q_4$ to $Q_5$, $Q_{10}$, $Q_{12}$ and $Q_{20}$.

Changes in load current produce related changes in the potential drop across $R_m$. The latter, in combination with reference potential $E_5$–$E_3$ (adjustable by way of $R_{14}$ in the auxiliary supply, FIGURE 2), determines the biasing of stage $Q_3$. For low values of load current the drop across $R_m$ is relatively small and the base-emitter of $Q_4$ approximates the less positive voltage $E_c$–$E_5$ which is adjustable and is derived from the auxiliary supply (see $R_{14}$, FIGURE 2). Under these conditions $Q_3$ is conducting and $Q_4$ is cut off thus opening the current sensing loop. At a preselected value of load current determined by the setting of $R_{14}$ (FIGURE 2) which controls $E_c$–$E_5$, the voltage across $R_m$ reaches a value sufficient to reduce conduction of $Q_3$ to the point where $Q_4$ becomes conductive. The collector current of $Q_4$ resulting from the foregoing produces forward drive for stage $Q_5$ by virtue of the drop across $R_{18}$. The resultant drop across $R_9$ produced by the collector current of $Q_5$, together with the loop response thereto, cuts off $Q_2$ to automatically disable the voltage regulating input circuit. Thus a rise in the voltage across $R_9$ ultimately causes the impedance of $Q_{20}$ to increase; output voltage drops and $Q_1$ conduction increases to the point where $Q_2$ is cut off by the potential across $CR_8$ and $CR_9$. The flow of collector current in $Q_5$ also automatically initiates current regulation; it influences stage $Q_{10}$, and therefore ensuing stages $Q_{12}$, and $Q_{20}$, in a manner similar to that prevailing during voltage regulation. Hence the loop functions to maintain the drop across $R_m$ constant thus producing current regulation.

MONITOR

The load monitor M includes a source of DC potential derived from the half-wave rectifier connected across secondary winding $SW_{10}$ and comprising $R_{31}$, $CR_{18}$ and $C_8$. In the voltage regulating mode this potential is applied to a series circuit comprising $R_{32}$, the V contact and arm of switch $S_1$, indicator L, preferably of gas discharge type, and the collector-emitter circuit of a transistor $Q_9$. The base of the latter is connected to the junction of $R_{19}$, $CR_8$ and the base of $Q_2$.

The emitter-base potential of $Q_9$ comprises the emitter-base potential of $Q_2$; during normal constant voltage conditions it is of sufficient magnitude to cut-off $Q_9$ whence indicator L is extinguished. Should a condition of over-current occur which is sufficient to drive the system into the constant current mode, then $Q_2$, as noted above, will be switched off and back biased due to the drop across $CR_8$, $CR_9$ and $R_7$. In this case $Q_9$ is switched on thus energizing indicator L to alert the user of this condition.

With switch $S_1$ in the position shown during constant-current operation, it is seen that indicator L and the collector-emitter of $Q_9$ are connected in shunt relationship and the combination energized via $R_{33}$ from the source developed across $C_8$. In the constant-current mode $Q_9$ is conducting as noted above, hence L is effectively shorted and thus extinguished. A load change such as a decreased load or an open circuit, initiates the constant voltage mode whereupon $Q_2$ is forward biased, $Q_9$ cuts off and L is energized. In this case too, then, the user is alerted to the condition.

In addition to indicating faults, it may be seen that the action of L alerts the user to human errors involving intent to operate in one mode while actually operating in the other. Thus, if load conditions require the constant current mode but the user believes the constant voltage mode prevails, he will place $S_1$ in the constant V position and by the lighting of L, be appraised of the error.

COARSE REGULATOR

The circuit of FIGURE 3 also illustrates portions of the coarse control circuit comprising gated rectifier $GR_1$ and related elements. The element $GR_1$ may comprise a silicon controlled rectifier which receives energizing pulses between its gate and cathode from the coarse regulator system via terminals $O_1$ and $O_2$. Also connected across these output terminals is a clipping diode $CR_{26}$.

Transient current limiting of the gated rectifier output is provided by the inductance in transformer $T_3$. Diode $CR_{24}$ which is connected across the primary of $T_3$ supplies a path for the current which flows out of $T_3$ at the end of the conduction period. $T_3$ includes a secondary winding $SW_6$ for supplying a control pulse to the coarse regulator via terminals $F_1$, $F_2$, each time $GR_1$ conducts.

One input to the coarse regulator is derived from terminals $I_1$, $I_2$, connected directly and via $R_{61}$ across the components in the negative leg of the main supply and essentially providing a voltage related to the drop across the fine control circuit and current sensing resistor, including $R_{64}$, transistor $Q_{20}$, $R_{70}$, $CR_{46}$, $CR_{47}$ and $R_m$. The effect of the coarse regulator, as described more fully below, is to maintain this drop constant by the mechanism of regulating the voltage developed across the main filter $C_{22}$ through the switching control exercised over $GR_1$.

It should be noted that the coarse control unit does not function to keep the emitter-collector potential of $Q_{20}$ constant as has been heretofore proposed in some prior art arrangements. This potential may vary substantially, particularly as load current varies. However, during those intervals when the emitter-collector potential is relatively high, load current is low and dissipation is accordingly low.

This effect is accomplished by maintaining constant, the voltage across the entire series circuit in the negative branch of the supply. This arrangement has the advantage of preventing $Q_{20}$ from passing into its saturated region with concomitant loss of control. If the circuit were arranged to keep $Q_{20}$ just above saturation, then the coarse loop would have to be in continuous and rapid control to prevent the voltage of $Q_{20}$ from falling into the saturation region during disturbances. This would place stringent requirements on the coarse regulator. If on the other hand the coarse regulator arrangement were set to keep the emitter-collector of $Q_{20}$ at a sufficiently high voltage so that saturation would never occur even with a relatively slow and discontinuous coarse loop, then the dissipation of $Q_{20}$ would be relatively high. The device herein avoids both of these conditions by maintaining the voltage across all the series elements at an approximately constant value. With this arrangement the emitter-collector potential of $Q_{20}$ may become high under certain conditions but at these times the load current, and hence dissipation, is low.

Figure 4:
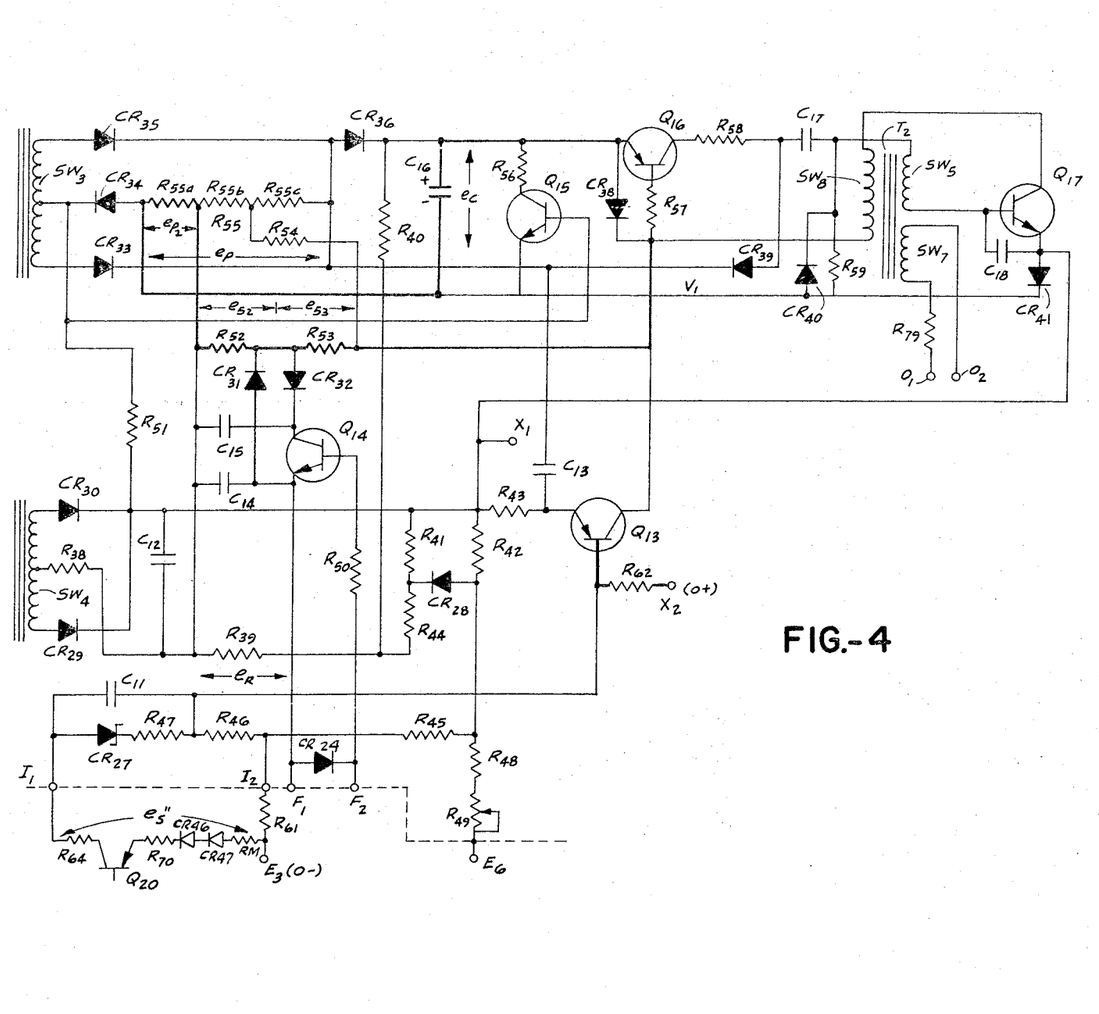
FIGURE 4 is a schematic wiring diagram of the coarse regulator component of the supply.

Speaking generally, the coarse regulator embodiment as illustrated in FIGURE 4 involves means for developing a uniquely-shaped time varying voltage which is synchronized with the line frequency and impressed on switching means including a transistor $Q_{16}$. The transistor is responsive to this and other voltages including an input control signal related to the drop across the series elements in the negative leg of the supply; as a consequence, the switching means are energized at a required instant of time to produce an output pulse, appearing at output terminals $O_1$ and $O_2$, which is applied to the coarse control gated rectifier $GR_1$ causing the same to conduct whereupon current is delivered to the main filter condenser $C_{22}$ (see FIGURE 3).

Control over the actuation time of the switching means provides in turn control over the instant of time during each power input cycle applied at terminals $V_1$ and $V_2$ (see FIGURE 3) that the gated rectifier fires. Since the input to the gated rectifier comprises a full wave rectified signal, then the firing time will determine the amount of charge delivered to and hence the voltage across the main filter $C_{22}$. Circuit parameters and connections are so adjusted that the gated rectifier switching is effective to produce a voltage across $C_{22}$ which is offset from the final supply output by a constant amount. Hence the voltage across the series control and current sensing circuit is maintained constant.

(1) Firing time control

In developing a time varying voltage for application to $Q_{16}$, there is provided a winding $SW_3$ (FIGURE 4) which may be a part of transformer $T_1$. The voltage appearing across winding $SW_3$ is subjected to full wave rectification by means of rectifiers $CR_{35}$ and $CR_{33}$ connected to the respective ends of the secondary winding. A full wave rectified voltage $e_p$ thus appears across the serial network comprising resistors $R_{55a}$, $R_{55b}$ and $R_{55c}$, it being noted that one end of this network is connected to the cathodes of $CR_{33}$ and $CR_{35}$ while the other end is connected to the center tap of $SW_3$ through a diode $CR_{34}$. The voltage $e_p$ charges a capacitance $C_{16}$ via a diode $CR_{36}$. If it is assumed that circuit conditions permit the full charging of $C_{16}$, it is evident that the condenser will charge to the peak value of $e_p$ through diode $CR_{36}$.

Transistor $Q_{16}$ has its emitter connected to $C_{16}$ at the junction of $C_{16}$ and $CR_{36}$. The base is connected to the other side of $C_{16}$ through the series combination $R_{57}$, $R_{53}$, $R_{52}$ and $R_{55a}$.

Examination of the circuit between the emitter and base of $Q_{16}$ (and ignoring the drop across $R_{57}$) indicates that the emitter base voltage, $e_{eb}$ is the sum of several voltages;

$$e_{eb} = e_c + e_{p2} + e_{52} + e_{53}$$

The voltages $e_{52}$, $e_{53}$, in the above relationship are employed to control the energizing time of $Q_{16}$ during each cycle of operation.

Figure 4A:
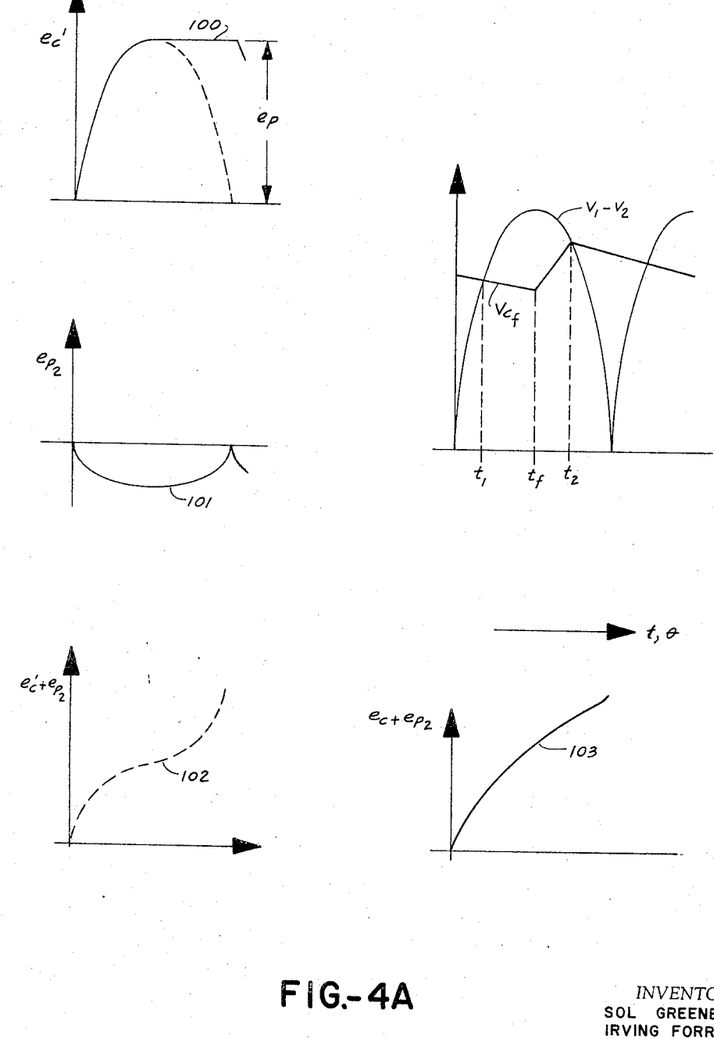
FIGURE 4A comprises plots of certain time functions helpful in understanding the operation of the coarse regulator.

That component, $e_c'$, of the voltage $e_c$ which is due to $e_p$ may be represented by the waveform 100 in FIGURE 4A which illustrates the charging of voltage $e_c'$ with time as the capacitance $C_{16}$ charges to the peak value of $e_p$. (An additional component of $e_c$ will be described hereinafter.) Discharge of $C_{16}$ occurs at the end of every cycle through a path shunting $C_{16}$ and comprising $R_{56}$ and the collector-emitter of an npn transistor $Q_{15}$. Since the emitter-base of this stage is connected across $CR_{34}$, $Q_{15}$ conducts and discharges $C_{16}$ at the end of every cycle when the potential across $CR_{34}$ drops to a low value.

The voltage $e_{p2}$ which is added to $e_c'$ in the base-emitter circuit of $Q_{16}$, is illustrated by waveform 101; the algebraic sum $(e_c' + e_{p2})$ is shown at 102.

The generation of voltage $(e_c' + e_{p2})$ may be appreciated from a consideration of certain performance requirements. First, in view of the characteristics of gated rectifier $GR_1$, there is the problem of extinguishing this element once it is fired. Like a thyratron, gated rectifiers as herein employed can only be extinguished, once their gate-cathode circuits have been energized, by reducing and in the usual case, reversing their anode-cathode potentials. Referring to FIGURE 3, it is seen that the anode-cathode potential of $GR_1$ is determined by the difference between the full wave bridge voltage $V_1$-$V_2$ and the voltage $V_{cf}$ across filter $C_{22}$. Typically, and with certain exaggeration for illustration, these two voltages may be represented as shown in FIGURE 4A. If $GR_1$ is controlled to fire throughout the range 0° to 90°, then $GR_1$ will remain conductive and $V_{cf}$ will tend to charge to the peak value of $V_1$-$V_2$ irrespective of the firing time; after $V_{cf}$ reaches this value, the net anode-cathode potential of $GR_1$ reverses and the rectifier cuts off. Hence, the capacitor voltage is not readily controllable as a function of firing time. For this and other reasons, the control region 45° to 180° is selected to be the working range of $GR_1$; for many conditions the control range will primarily lie within 90° and 180°.

If the emitter-base circuit of stage $Q_{16}$ were connected to be responsive, for a given value of control voltage $(e_{52} + e_{53})$, to the sum of $e_c'$ and $e_p$ then the firing point could not be controlled during the interval 0°–90° because during this interval this voltage difference is substantially constant (and also small, being the drop across $CR_{36}$). In the interval 90°–180°, however, this voltage is varying dynamically and the firing point could be controlled, depending on the value of voltage $(e_{52} + e_{53})$, to occur at any instant in this range prior to $t_2$.

If on the other hand, the emitter-base circuit of $Q_{16}$ were, for a given value of control voltage $(e_{52} + e_{53})$ responsive solely to $e_c'$, then the firing angle could only occur between 0° and 90° (after $t_1$) as it is only during this interval $e_c'$ is varying dynamically.

By making the base responsive to the algebraic difference between $e_c'$ and $e_{p2}$, a voltage $(e_c' + e_{p2})$ is obtained (102, FIG. 4A) which is dynamically varying throughout the range 0° to 180° thus providing a wide latitude in the firing point. Moreover, in avoiding the phase shifting techniques which have heretofore characterized control circuits for many controlled rectifiers, the arrangement functions substantially independent of wave shape and independent of frequency over a wide range (recall that the supply operates within specifications over a frequency range greater than 10).

While the development of voltage $(e_c' + e_{p2})$ yields the foregoing advantages, it has one potential disadvantage related to the region $\theta \cong 90°$. It may be noted by reference to the waveform 102 that in this region the slope of $(e_c' + e_{p2})$ is zero. In view of this condition, the possibility of instability in the region $\theta \cong 90°$ increases.

To circumvent this potential condition, slope modifying means are employed comprising a source of voltage $e_k$ and a resistance $R_{40}$. The latter is connected to one side of $C_{16}$ while its other side connects to the junction of $R_{39}$ and $R_{44}$ in the series divider $R_{39}$, $R_{44}$ and $R_{41}$. This divider is connected across a source of DC potential derived from a full wave rectifier which includes center-tapped winding $SW_4$, conveniently a part of a transformer $T_1$, rectifier diodes $CR_{29}$, $CR_{30}$ and filter capacitance $C_{12}$. The filter is connected between the common cathodes of $CR_{29}$, $CR_{30}$ and a resistor $R_{38}$, the other terminal of which connects to the center tap. The divider $R_{39}$, $R_{44}$, $R_{41}$ is connected across $C_{12}$ whereupon the potential $e_k$ appears across $R_{39}$.

This potential $e_k$ supplies a charging current to $C_{16}$ via $R_{40}$ and $R_{55a}$, adding a second component to $e_c$. Circuit values are adjusted such that this charging current affects the slope of the voltage $e_c$, particularly in the interval $\theta = 70°$–180°, whereupon the net slope of $e_c + e_{p2}$ is no longer zero at 90°. The resultant waveform $e_c + e_{p2}$ is shown at 103 in FIGURE 4A. It should be noted that the component $e_{p2}$ of this voltage is responsive to transient line voltage variation and thus introduces a compensating response to such variations into the firing circuit.

The dynamically varying voltage $(e_c + e_{p2})$ is applied to the emitter-base circuit of $Q_{16}$ and tends to forward bias the same. However, this voltage is opposed by the voltage $(e_{52} + e_{53})$ and until the latter is exceeded, $Q_{16}$ remains cut off. The value of $(e_{52} + e_{53})$ depends on the input to the coarse regulator and other factors as shown below; as it varies, the conduction period of $Q_{16}$ and $GR_1$ will vary accordingly to maintain the voltage $V_{cf}$ at a value different from the output voltage to keep the drop across the series elements in the negative leg of the supply at a substantially constant value.

(2) Pulse output circuit

The switching of stage $Q_{16}$ produces an output pulse by way of the circuit connected as follows. The collector of $Q_{16}$ is returned to the positive side of the $e_p$ supply via $R_{58}$ and $CR_{39}$. The junction of these elements is connected to capacitance $C_{17}$, the other side of which is connected to the negative terminal of the $e_p$ supply via the parallel combination of $CR_{40}$ and $R_{69}$. This other side of $C_{17}$ also connects to the base of output stage $Q_{17}$, an npn transistor, via a winding $SW_5$ on an output transformer $T_2$. The collector of $Q_{17}$ is connected to the side of $R_{57}$ which is remote from $Q_{16}$ by way of a winding $SW_8$ on $T_2$. The emitter of $Q_{17}$ is connected to the base via $C_{18}$ and to the negative terminal of the $e_p$ supply via $CR_{41}$. Also provided on $T_2$ is an ouput winding $SW_7$ which is connected to output terminals $O_1$ and $O_2$ via resistor $R_{79}$.

When $Q_{16}$ is switched into conduction at the time its emitter-base potential rises to the threshold value, $C_{16}$ discharges through $Q_{16}$, initiating a series of rapid actions which produce a gate pulse for the controlled rectifier at output terminals $O_1$ and $O_2$.

One discharge path for $C_{16}$ comprises the emitter-base of $Q_{16}$, $R_{57}$, $R_{54}$, $R_{55b}$ and $R_{55a}$; a related branch comprises the emitter-base of $Q_{16}$, $R_{57}$, $R_{53}$, $R_{52}$ and $R_{55a}$. Current through the emitter-base portion of these branches is limited by reason of the diode $CR_{38}$ connected from the emitter of $Q_{16}$ to $R_{57}$.

The forward emitter-base current of $Q_{16}$ lowers the emitter collector impedance thereof causing a further discharge of $C_{16}$, through the emitter-collector of $Q_{16}$, through $R_{58}$ and thence through a number of parallel return paths, one of the most significant being the path comprising winding $SW_5$, the base-emitter of output stage $Q_{17}$ and $CR_{41}$. Current in this path switches $Q_{17}$ into the conductive state. Hence, additional current flows through the collector-emitter of $Q_{17}$ via winding $SW_8$. The latter is in voltage aiding relationship with winding $SW_5$ in the base-emitter circuit of $Q_{17}$ thus providing a regenerative action which produces substantial current flow through $Q_{17}$ and a related gate pulse at the output terminals $O_1$ and $O_2$ connected to winding $SW_7$. This pulse fires rectifier $GR_1$.

(3) Input circuit

As noted in the initial discussion covering the firing time of $Q_{16}$, the control votage $(e_{52} + e_{53})$ thereof depends in part on the collector current of an input stage $Q_{13}$. The emitter-collector circuit thereof is energized from the auxiliary source of potential appearing across filter $C_{12}$ via $R_{43}$, $R_{53}$ and $R_{52}$. The positive side of this source is connected to the emitter of $Q_{13}$ through resistance $R_{43}$ while the collector is returned to the negative side of the auxiliary source through the circuit comprising $R_{53}$ and $R_{52}$ in series. Accordingly, a part of the potential drop $(e_{52}+e_{53})$ is a function of the emitter-collector current of $Q_{13}$. The latter is controlled in turn by the emitter-base potential of $Q_{13}$.

The emitter-base circuit of $Q_{13}$ includes a series-parallel network of branches each of which introduces appropriate signals into the emitter-base circuit to thereby effect the firing time.

One circuit between the emitter and base comprises the serial resistances $R_{43}$, $R_{42}$, $R_{45}$, and $R_{46}$. Resistance $R_{46}$ is also common to a circuit which includes a zener diode $CR_{27}$, resistance $R_{47}$ and resistances $R_{46}$ and $R_{61}$. Across this network is the potential $e_s''$ dropped across the series elements in the negative leg of the supply. Hence the potential across $R_{46}$ is a function of the difference or error voltage between the potential $e_s''$ to be controlled, and the reference potential supplied by $CR_{27}$.

The resistance $R_{45}$ in the emitter-base circuit of $Q_{13}$ is common to another network of serial resistances $R_{61}$, $R_{45}$, $R_{48}$ and $R_{49}$. This network is supplied by reference potential $E_3$–$E_6$ and the net potential developed across $R_{45}$ from this source is adjustable by way of $R_{49}$ which is set to achieve the desired operating level of the coarse regulator and thus determines the value at which $e_s''$ is maintained.

A third input to $Q_{13}$ is developed across $R_{42}$. This resistance is connected across $R_{41}$ in the divider of the auxiliary source $SW_4$, $CR_{29}$, $CR_{30}$, by way of diode $CR_{28}$. Hence $R_{42}$ introduces a voltage related to the steady state line voltage.

A still further input to $Q_{13}$ is effected by way of a network which includes resistance $R_{62}$, connected at one end via terminal $X_2$ to output terminal $O(+)$, resistance $R_{46}$, and resistance $R_{61}$ which connects at its other end to output terminal $O(-)$. Hence a voltage related to the output voltage of the supply is coupled to the input of $Q_{13}$.

An additional input which is provided as a safety measure is derived from the main output divider at the junction of $R_{3b}$ and $R_{3c}$ (FIGURE 3), being applied via diode $CR_1$ and terminal $X_1$ to the junction of $R_{42}$, $R_{43}$ in the base-emitter circuit of $Q_{13}$. This connection disables the coarse regulator in the event the pass transistor $Q_{20}$ becomes short-circuited.

An additional component in the base-emitter of $Q_{13}$ which effects the transient response thereof is the capacitance $C_{11}$ which bridges $CR_{27}$ and $R_{47}$. This capacitance serves several functions; it effects cut-off of $Q_{13}$ under certain conditions hereinafter noted, and it integrates the error signal over a period of several cycles for reasons hereinafter noted.

(4) General operation

The foregoing inputs effect the emitter-collector current of $Q_{13}$ and the resultant potential $(e_{52}+e_{53})$. Hence these inputs influence the firing time of $Q_{15}$ and the responsive firing time of $GR_1$.

The long term effect of a decrease in load may be first considered. Such a load decrease would tend to raise the voltage $V_{cf}$ developed across filter $C_{22}$. Assuming the output voltage is held constant by the fine regulator, then the voltage, $e_s''$, across the series elements in the negative branch would tend to rise. This has the effect of forwardly biasing $Q_{13}$ and the emitter-collector current thereof would tend to rise. Hence $(e_{52}+e_{53})$ would rise. Since this potential reverse-biases stage $Q_{16}$, a rise thereof means that the voltage $(e_{52}+e_{53})$ will not reach the point where $Q_{16}$ conducts until a relatively later time in the cycle. Thus $GR_1$ fires at a later time and $V_{cf}$ is reduced to offset the effect of decreased load. An increased load has the opposite effect.

Operation at an elevated line voltage is reflected in a change in the potential across $R_{42}$ in the direction tending to increase conduction through $Q_{13}$. Hence, like the condition of decreased load, the voltage $(e_{52}+e_{53})$ increases and $GR_1$ fires at a later time. Reduced line voltage has the opposite effect. These effects are also manifested to some degree on the basis of their effects on the voltage $e_s''$.

The output voltage selected by the user in the constant voltage mode also influences the net coarse regulator input. If the output voltage is adjusted for a decreased value, then the potential at $X_2$ will decrease. Current through $R_{62}$, $R_{46}$ and $R_{61}$ will decrease whereby $Q_{13}$ is more forwardly biased. Like the case of decreased load, the conduction of $Q_{13}$ will increase and $GR_1$ will fire at a later time. $V_{cf}$ is thereby lowered. An increase in output voltage has the opposite effect and both of these circuit reactions will occur as the output voltage decreases and increases due to increases and decreases of load in the constant current mode.

(5) Anticipation function-phase advance

The foregoing explanations have excluded certain problems associated with control over the gated rectifier. Since the coarse regulator is discontinuous in operation, it tends to provide regulation on an average basis. To overcome this tendency and to prevent hunting and related phenomena, the coarse regulator is provided with additional circuits which provide anticipatory and related actions.

As seen in FIGURE 3, there is inserted in the positive leg of the supply a transformer $T_3$ having a primary $P_3$ and a secondary $SW_6$. Connected across the primary is a clipping diode $CR_{24}$. The secondary connects to coarse regulator input terminals $F_1$ and $F_2$. A pulsating voltage appears across these terminals each time the gated rectifier conducts.

As seen in FIGURE 4, a clipping diode $CR_{24}$ is connected across terminals $F_1$ and $F_2$. That portion of the voltage which is not clipped is coupled via $R_{50}$ to the emitter base circuit of an npn transistor $Q_{14}$. The collector of $Q_{14}$ is connected to the junction of a diode $CR_{32}$ and capacitance $C_{15}$. This series combination of diode and capacitor is connected across $R_{52}$; $C_{15}$ thus tends to charge to the voltage $e_{52}$. Another series combination comprising $C_{14}$ and $CR_{31}$ is also connected across $R_{52}$, the diode $CR_{31}$ being poled opposite to that of $CR_{32}$. The emitter of $Q_{14}$ is connected to the junction of $C_{14}$ and $CR_{31}$. When the input pulse appearing at $F_1$–$F_2$ is applied to the emitter-base of $Q_{14}$ causing conduction of the latter, the voltage across $C_{15}$ is transferred to $C_{14}$ through the collector-emitter circuit of $Q_{14}$.

Under steady state conditions the voltage across $C_{14}$ is approximately equal to the voltage across $C_{15}$ and the latter tends to equal the voltage $e_{52}$. As noted hereinbefore, the conduction time depends on and is related to $e_{52}$. Hence all of these voltages tend to be approximately equal to the steady-state conduction angle and this arrangement thus constitutes a memory system.

The required transient response of the system presents special problems. The coarse loop is discontinuous in operation since output is only effected once each cycle when $GR_1$ fires. Furthermore, the controlled rectifier operates in relation to the non-linear waveform characterizing the power input cycle (which ideally is sinusoidal). Hence the charge delivered to the filters through the controlled rectifier is not proportional to the conduction period. Compounding the problem is the need to meet the requirements of the supply in both the constant (but adjustable) voltage mode, and the constant (but adjustable) current mode, and the requirement of many users that transients be of short duration and low amplitude when switching from no-load to full-load condition.

The solution to the foregoing problems involves in part the above noted memory circuit. During transients, e.g., those resulting from application of full load, input stage $Q_{13}$ is cut off. This results from the transient drop in $e_s''$; the transient voltage is coupled rapidly into the base-emitter circuit of $Q_{13}$ via $C_{11}$ and the input stage is cut-off.

When $Q_{13}$ cuts off, the DC potentials $e_{52}$ and $e_{53}$ tend to vanish. Thus diode $CR_{31}$, connected to memory capacitor $C_{14}$, becomes forward biased and the voltage across $C_{14}$ is applied to $R_{52}$ whence the original voltage $e_{52}$ is reestablished. In addition, $C_{14}$ discharges via $CR_{31}$ through $R_{53}$, $R_{54}$ and $R_{55b}$ thus adding an instantaneous voltage to $R_{53}$ which is opposite in polarity to the voltage appearing across this resistance during the prior steady state condition. Hence, during the transient the original voltage across $R_{53}$ is replaced by a voltage of opposite polarity. Since this opposite polarity voltage is a function of the voltage originally stored on $C_{14}$ and since that stored voltage is a function of the prior steady state firing angle, then the input circuit of switching stage $Q_{16}$ receives a voltage change whose amplitude depends on the prior steady state conduction angle. The change is of a direction to instantaneously advance the firing time (earlier firing) so that $GR_1$ fires sooner in the half wave period. Since the amount of instantaneous advance is proportional to the prior steady state conduction period, then the lack of linearity between filter charge and conduction angle is compensated. Thus, where the prior steady state conduction period starts late in the cycle corresponding to a low output voltage, the instantaneous advance in firing angle when load is applied is relatively small, but under these conditions a large change in the charge delivered to the filter is effected. When the prior steady state conduction period starts relatively early in the cycle corresponding to a high output voltage the amount of transient angular advance with application of load is proportionately larger and this action satisfies the behavior of the sinusoidal power cycle which requires at earlier periods a greater advance in firing time to deliver the same charge to the filters as is delivered under low voltage, late firing, conditions.

In studying and practising the invention, modifications will undoubtedly occur to those skilled in the art. The invention is not limited to the specific mechanisms shown and described but departures may be made therefrom within the scope of the accompanying claims without departing from the principles of the invention and without sacrificing its chief advantages.

Subject matter disclosed herein is also the subject matter of copending applications Ser. No. 285,632, filed June 5, 1963, and Ser. No. 285,715, filed June 5, 1963, now U.S. Patent 3,304,490; assigned to assignee of the instant application.

What is claimed is:

1. An improved variable impedance regulator for an A.C. to D.C. power supply of the type including a source of relatively unregulated potential, an output circuit for delivering a regulated output, a series variable impedance circuit between said source and said output circuit and having a pass transistor therein, the cascaded combination for controlling said pass transistor of (1) error detector means responsive to said output, (2) amplifying means, and (3) driver means, said improvement comprising said comprising a pair of paralleled, complementary transistors alternatively operative, one of said complementary transistors normally operative with respect to signals from said error detector, circuit means operative in dependence on temperature conditions, said circuit means being connected to render said other complementary transistor conductive when the temperature exceeds a predetermined value.

2. A regulator as defined in claim 1 in which said driver means includes a transistor with a collector-emitter circuit interconnected with the emitter-base circuit of said pass transistor for conduction by said driver of a portion of load current to thereby perform a supplementary regulating function.

3. An improvement for AC to DC regulators of the type including:
a coarse current controlling regulator for controlling current flow from an unregulated source to a filter unit, and
a fine current controlling regulator for controlling the current flow from said filter unit to the output terminals, said fine regulator
including a variable current controlling impedance in one of the lines leading to the output terminals, said variable impedance being in series with a fixed current sensing impedance and
being operative in response to current sensing signals developed in said fixed impedance and voltage sensing signals developed across an impedance between the output terminals;
said improvement comprising
a circuit for connecting said coarse regulator for response to the potential appearing across the combination of said variable impedance in series with said fixed impedance; and
said coarse regulator being operative in a manner tending to maintain the potential across the series combination of said variable and fixed impedances substantially constant.

4. An AC to DC regulated power supply comprising:
a source of relatively unregulated potential;
a filter unit;
output terminals;
circuit means for connecting said source to said filter unit and including therein a semiconductor switch for controlling current flow to said filter unit;
circuit means for interconnecting said filter unit and said output circuit and including therein a variable impedance for controlling current flow to said output circuit;
voltage sensing means connected across said output terminals;
current sensing means including a fixed impedance connected in series between said variable impedance and one of said terminals;
fine regulator circuit means responsive to signals from said voltage and current sensing means, and operative to control said variable impedance;
coarse regulating circuit means for controlling said semiconductor switch, and
circuit means for connecting the input of said coarse regulating circuit across the series combination of said variable and fixed impedances so that said coarse regulating circuit tends to control current flow to said filter unit in a manner which maintains a substantially constant potential across said series combination of variable and fixed impedances.

5. A regulated power supply according to claim 4 in which said variable impedance is a transistor.

6. A regulated power supply according to claim 4 in which
said source provides a potential in the form of successive half sinusoids, and
said semiconductor switch is a controlled rectifier rendered conductive at a selected time during each successive half sinusoid.

7. An AC to DC regulated power supply comprising:
a source providing substantially unfiltered, rectified alternating current consisting essentially of successive half sinusoids;
a filter unit;
output terminals;
circuit means for connecting said source to said filter circuit via a controlled rectifier connected for controlling current flow to said filter circuit;
circuit means for interconnecting said filter unit and said output circuit and including therein a variable impedance for controlling current flow to said output circuit;
voltage sensing means connected across said output terminals;
current sensing means including a fixed impedance connected in series between said variable impedance and one of said terminals;

fine regulator circuit means responsive to signals from said voltage and current sensing means, and operative to control said variable impedance;

coarse regulating circuit means including
- circuit means coupled to said source for providing a first signal which increases with time throughout the duration of each half sinusoid;
- circuit means coupled to said fine regulator circuit means and operative to provide a second signal which is a function of the potential across the series combination of said variable impedance and said fixed impedance, and
- pulse generating circuit means responsive to said first and second signals and connected to said controlled rectifier to supply a pulse which renders said controlled rectifier conductive when the value of said first signal exceeds the value of said second signal.

8. A regulated power supply according to claim 7 further comprising circuit means connected for varying said second signal as a function of the magnitude of the potential provided by said source.

9. A regulated power supply according to claim 7 wherein said circuit means for providing said first signal provides a first signal which reaches approximately the same peak magnitude regardless of source frequency.

10. A regulated power supply comprising;
a rectifying circuit connected to an AC source;
an output circuit;
a controlled rectifier;
circuit means including said controlled rectifier for coupling said rectifying circuit to said output circuit and controlling current flow therebetween;
circuit means coupled to said AC source for providing a first signal which increases throughout the duration of successive half cycles of said source;
circuit means for providing a second signal which is a function of a control condition;
pulse generating circuit means for supplying pulses to said controlled rectifier for rendering the same conductive for the remainder of a half cycle of said source, said circuit means being responsive to said first and second signals and being operative to provide a pulse when said first signal exceeds the magnitude of said second signal; and
circuit means responsive to changes in said control condition between two successive half cycles and operatively connected to modify said second signal in accordance with said change to increase the effect of said change.

11. A regulated power supply according to claim 10 wherein said last named circuit means includes:
a circuit for storing a signal proportional to the value of said second signal and during each half cycle, and
a circuit for modifying said second signal during the next half cycle in accordance with the change between successive half cycles.

12. A wide band regulated power supply comprising an AC source;
a rectifying circuit coupled to said source;
a filter circuit;
circuit means for coupling said rectifying circuit to said filter circuit and including a controlled rectifier for controlling current flow to said filter circuit;
circuit means coupled to said source for providing a first signal which
continuously increases throughout each half cycle of said source, and
reaches approximately the same peak value during each half cycle regardless of source frequency;
control circuit means for providing a second signal; and
pulse generating circuit means responsive to said first and second signals and operatively connected to supply a pulse to said controlled rectifier for rendering the same conductive when the magnitude of said first signal exceeds the magnitude of said second signal.

13. A regulated power supply according to claim 12 wherein said circuit means for providing said first signal comprises:
first circuit means for providing a signal which increases sinusoidally during the interval from 0–90° and which thereafter remains at the peak value, and
second circuit means connected for adding thereto a half-wave sinusoidal signal having a lesser magnitude and opposite polarity.

14. A regulated power supply according to claim 12 wherein said peak value of said first signal varies as a function of said source voltage.

15. A regulated power supply according to claim 12 wherein said control circuit means provides a second signal of a magnitude which causes said controlled rectifier to be rendered conductive in the interval between 90–180°.

References Cited
UNITED STATES PATENTS

| | | | |
|---|---|---|---|
| 2,981,884 | 4/1961 | Tighe | 323—22 |
| 3,060,368 | 10/1962 | Poitras | 323—22 |
| 3,101,442 | 8/1963 | Darbie et al. | 323—22 |
| 3,105,933 | 10/1963 | Proc | 323—22 |
| 3,192,467 | 6/1965 | Baracket | 323—22 |
| 3,213,351 | 10/1965 | Walker | 321—18 |
| 3,219,912 | 11/1965 | Harrison | 323—22 |

OTHER REFERENCES

Electronics, "Power Supply Uses Switching Preregulation," J. S. Riordon, Mar. 9, 1962, pp. 62–64.

JOHN F. COUCH, *Primary Examiner.*

W. E. RAY, W. H. BEHA, JR., *Assistant Examiners.*